US012573065B2

(12) United States Patent
Choset et al.

(10) Patent No.: US 12,573,065 B2
(45) Date of Patent: Mar. 10, 2026

(54) VISION SENSING DEVICE AND METHOD

(71) Applicant: Carnegie Mellon University, Pittsburgh, PA (US)

(72) Inventors: Howie Choset, Pittsburgh, PA (US); Michael B. Schwerin, Pittsburgh, PA (US); Lu Li, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 536 days.

(21) Appl. No.: 17/924,570

(22) PCT Filed: May 11, 2021

(86) PCT No.: PCT/US2021/031751
§ 371 (c)(1),
(2) Date: Nov. 10, 2022

(87) PCT Pub. No.: WO2021/231406
PCT Pub. Date: Nov. 18, 2021

(65) Prior Publication Data
US 2023/0186496 A1     Jun. 15, 2023

Related U.S. Application Data

(60) Provisional application No. 63/023,049, filed on May 11, 2020.

(51) Int. Cl.
G06T 7/521       (2017.01)
G01B 11/25       (2006.01)
(Continued)

(52) U.S. Cl.
CPC ............ G06T 7/521 (2017.01); G01C 11/025 (2013.01); G01C 11/28 (2013.01); G06T 15/00 (2013.01);
(Continued)

(58) Field of Classification Search
CPC ..................... G06T 7/521; G06T 15/00; G06T 2207/10028; G06T 2207/10144;
(Continued)

(56) References Cited

U.S. PATENT DOCUMENTS 11,567,201 B2 *    1/2023   Zhang ........................ G01S 7/51
2016/0307328 A1 *  10/2016  Moeglein ................ G06T 7/579
(Continued)

FOREIGN PATENT DOCUMENTS

WO      WO-2020047338 A1 *   3/2020    ........ B60W 60/0011

*Primary Examiner* — Stephen R Koziol
*Assistant Examiner* — Joshua Chen
(74) *Attorney, Agent, or Firm* — The Webb Law Firm

(57)          ABSTRACT

Provided is a vision sensing device including a housing, a camera, a laser pattern generator, an inertial measurement unit, and at least one processor configured to project a laser pattern within the field of view of the camera, capture inertial data from the inertial measurement unit as a user moves the housing, capture visual data from the field of view with the camera as the user moves the housing, capture depth data with the laser pattern generator as the user moves the housing, and generate an RGB-D point cloud based on the visual data, the inertial data, and the depth data.

23 Claims, 4 Drawing Sheets

(51) Int. Cl.

| | | |
|---|---|---|
| *G01C 11/02* | (2006.01) | |
| *G01C 11/28* | (2006.01) | |
| *G01C 21/16* | (2006.01) | |
| *G06T 7/55* | (2017.01) | |
| *G06T 15/00* | (2011.01) | |
| *H04N 25/589* | (2023.01) | |

(52) U.S. Cl.
CPC . *H04N 25/589* (2023.01); *G06T 2207/10028* (2013.01); *G06T 2207/10144* (2013.01)

(58) Field of Classification Search
CPC ............ G06T 2207/10016; G06T 7/55; G01C 11/025; G01C 11/28; G01C 21/1652; G01C 21/3848; H04N 25/589; G01B 11/2518
See application file for complete search history.

(56) References Cited

U.S. PATENT DOCUMENTS

| | | | | |
|---|---|---|---|---|
| 2019/0188471 | A1* | 6/2019 | Osterhout | G06F 3/012 |
| 2019/0297312 | A1* | 9/2019 | Price | G02B 27/0093 |
| 2021/0055420 | A1* | 2/2021 | Wohlfeld | H04N 23/13 |

* cited by examiner 102
106
104
100
1000

210 Illumination LEDs

202 Vision Camera

206 Laser Pattern Generator

208 LED Driver

204 Laser Driver

214 Wireless Subsystem*

200 Processor

201 CoProcessor Subsystem*

216 IMU

212 Interface Subsystem

1000

INCIDENT LASER STRIPE
404

LASER PLANE
406

$\pi_l : \mathrm{n} \cdot \mathrm{X} + d = 0$

1000

LOS RAY

CYLINDRICAL
LENS
402

$u$

WORLD PT.
$X_i$ $z=1$ $\{c\}$

DOT LASER
EMITTER $v$

NORMALIZED PT.
$X_{ic}$

502  Laser        off        on        off        on        · · ·

504  Shutter
     Speed        long       short      long       short      · · ·

506  Image                                                     · · ·

$t_0$        $t_1$        $t_2$        $t_3$        $t_4$        $t$

Keyframe poses
$\mathcal{I}_{ac}$ poses
Features on laser
Other features
Raycast intersection
Laser PCD in window
Laser PCD in map
IMU trajectory Calibration Setup    Laser Plane Fitting Result

VISION SENSING DEVICE AND METHOD

CROSS-REFERENCE TO REPLATED APPLICATIONS

This application is the United States national phase of International Application No. PCT/US2021/031751 filed on May 11, 2021, and claims priority to United States Provisional Patent Application No. 63/023,049 filed on May 11, 2020, the disclosures of which are hereby incorporated by reference in their entireties.

BACKGROUND

1. Field

This disclosure relates generally to a vision sensing device and method and, in non-limiting embodiments, to a handheld vision sensing device and method for scanning an object or environment to generate a visual representation.

2. Technical Considerations

Three-dimensional (3D) scanning and reconstruction in confined spaces is important for many tasks, such as manufacturing aircraft wings, inspecting narrow pipes, examining turbine blades, and the like. Such scanning tasks are challenging because confined spaces tend to lack a positioning infrastructure, and conventional sensors often cannot detect objects in close range. Existing technology does not provide for a sensor system with short range, high accuracy two-dimensional (2D) and 3D vision sensing that is compact and low cost. Existing visual sensor systems require an additional, external computing device to perform the necessary computations. Existing visual sensor systems are designed to operate in wide-open spaces and are not accurate within confined spaces. As a result, such existing systems are too large, unable to operate at short-range, and unable to localize for scanning accuracy without external positioning infrastructure.

SUMMARY

According to non-limiting embodiments or aspects, provided is a vision sensing device comprising: a housing; a camera arranged within the housing and having a field of view; a laser pattern generator arranged within the housing; an inertial measurement unit arranged within the housing; and at least one processor arranged within the housing and in communication with the camera, the laser pattern generator, and the inertial measurement unit, the at least one processor configured to: project a laser pattern within the field of view of the camera; capture inertial data from the inertial measurement unit as a user moves the housing; capture visual data from the field of view with the camera as the user moves the housing; capture depth data with the laser pattern generator as the user moves the housing; and generate an RGB-D point cloud based on the visual data, the inertial data, and the depth data.

In non-limiting embodiments or aspects, the camera is configured to capture the visual data by: capturing a plurality of images in a series; and varying an exposure time of the camera while capturing at least two sequential images of the plurality of images in the series, such that the visual data comprises at least one first image with a first exposure time and at least one second image with a second exposure time longer than the first exposure time. In non-limiting embodiments or aspects, the exposure time of the camera is varied by automatically alternating between the first exposure time and the second exposure time. In non-limiting embodiments or aspects, the plurality of images comprises a first subset of images captured with the first exposure time and a second subset of images captured with the second exposure time, and wherein generating the RGB-D point cloud comprises: tracking a plurality of visual features in each image of the second subset of images; determining a subset of visual features of the plurality of features based on a distance of each visual feature of the subset of visual features to the laser stripe; and determining a subset of keyframes from the second subset of images based on the subset of visual features. In non-limiting embodiments or aspects, the distance of each visual feature to a laser stripe is based on the first subset of images.

In non-limiting embodiments or aspects, the RGB-D point cloud is generated by combining the visual data, the inertial data, and the depth data at the same time. In non-limiting embodiments or aspects, wherein generating the RGB-D point cloud comprises: generating a plurality of colored laser points based on a colored light in the visual data and the depth data; determining an estimated camera motion; mapping each colored laser point of the plurality of colored laser points into the RGB-D point cloud within a spatial representation; and aligning at least a subset of the plurality of colored laser points based on the estimated camera motion. In non-limiting embodiments or aspects, wherein generating the RGB-D point cloud is based on a Visual-Laser-Inertial-Odometry Simultaneous Localization and Mapping (VLIO-SLAM) algorithm, the visual data comprises a sequence of keyframes, and the at least one processor is further configured to: initialize the VLIO-SLAM algorithm by generating initial estimates of keyframe poses and feature depths in a sliding window. In non-limiting embodiments or aspects, wherein generating the initial estimates of keyframe poses and feature depths in the sliding window comprises: identifying a first keyframe and a second keyframe in the sliding window, the first keyframe comprising a primary observation frame of at least one feature; determining an up-to-scale estimation between the first keyframe and the second keyframe; determining a depth of each common feature point in the first keyframe and the second keyframe; determining a scale based on the depth of at least a subset of the common feature points; and determining the keyframe poses of other keyframes in the sliding window.

In non-limiting embodiments or aspects, the VLIO-SLAM algorithm causes the at least one processor to: determine keyframe poses, motion data, and inverse feature depths for each primary optimization frame of each feature of a plurality of features based on a nonlinear optimization. In non-limiting embodiments or aspects, the nonlinear optimization comprises minimizing residuals comprising at least one of the following: visual feature depth residual, visual feature reprojection residual, motion data residual, window-to-map tracking residual, or any combination thereof. In non-limiting embodiments or aspects, further comprising: a light emitting unit arranged within the housing and configured to emit colored light to at least a portion of the field of view when activated.

According to non-limiting embodiments or aspects, provided is a vision sensing device comprising: a housing; a camera arranged within the housing and having a field of view; a laser pattern generator arranged within the housing; a light emitting unit arranged within the housing and configured to emit colored light to at least a portion of the field of view when activated; and at least one processor arranged within the housing and in communication with the camera, the laser pattern generator, and the light emitting unit, the at least one processor configured to: activate the light emitting unit to emit colored light to at least a portion of the field of view; capture visual data from the field of view with the camera as a user moves the housing; capture depth data with a laser unit as the user moves the housing; and generate an RGB-D point cloud based on the visual data and the depth data.

In non-limiting embodiments or aspects, the camera is configured to capture the visual data by: capturing a plurality of images in a series; and varying an exposure time of the camera while capturing the plurality of images in the series, such that the visual data comprises at least one first image with a first exposure time and at least one second image with a second exposure time longer than the first exposure time. In non-limiting embodiments or aspects, the exposure time of the camera is varied by alternating between the first exposure time and the second exposure time. In non-limiting embodiments or aspects, the RGB-D point cloud is generated by combining visual data, the inertial data, and the depth data at the same time. In non-limiting embodiments or aspects, wherein generating the RGB-D point cloud comprises: generating a plurality of colored laser points based on the colored light in the visual data and the depth data; determining an estimated camera motion; mapping each colored laser point of the plurality of colored laser points into the RGB-D point cloud within a spatial representation; and aligning at least a subset of the plurality of colored laser points based on the estimated camera motion.

In non-limiting embodiments or aspects, generating the RGB-D point cloud is based on a Visual-Laser-Inertial-Odometry Simultaneous Localization and Mapping (VLIO-SLAM) algorithm, the visual data comprises a sequence of keyframes, and the at least one processor is further configured to: initialize the VLIO-SLAM algorithm by generating initial estimates of keyframe poses and feature depths in a sliding window. In non-limiting embodiments or aspects, wherein generating the initial estimates of keyframe poses and feature depths in the sliding window comprises: identifying a first keyframe and a second keyframe in the sliding window, the first keyframe comprising a primary observation frame of at least one feature; determining an up-to-scale estimation between the first frame and the second frame; determining a depth of each common feature point in the first frame and the second frame; determining a scale based on the depth of at least a subset of the common feature points; and determining the keyframe poses of other keyframes in the sliding window. In non-limiting embodiments or aspects, the VLIO-SLAM algorithm causes the at least one processor to: determine keyframe poses, motion data, and inverse feature depths for each primary optimization frame of each feature of a plurality of features based on a nonlinear optimization. In non-limiting embodiments or aspects, the nonlinear optimization comprises minimizing residuals comprising at least one of the following: visual feature depth residual, visual feature reprojection residual, motion data residual, window-to-map tracking residual, or any combination thereof.

According to non-limiting embodiments or aspects, provided is a vision sensing method comprising: projecting, with a laser unit, a laser pattern within a field of view of a camera arranged in a device; capturing inertial data from an inertial measurement unit arranged in the device as a user moves the device; capturing visual data from the field of view with the camera as the user moves the device; capturing depth data with the laser unit as the user moves the device; and generating, with at least one processor, an RGB-D point cloud based on the visual data, the inertial data, and the depth data.

In non-limiting embodiments or aspects, capturing the visual data comprises: capturing a plurality of images in a series; and varying an exposure time of the camera while capturing at least two sequential images of the plurality of images in the series, such that the visual data comprises at least one first image with a first exposure time and at least one second image with a second exposure time longer than the first exposure time. In non-limiting embodiments or aspects, the exposure time of the camera is varied by automatically alternating between the first exposure time and the second exposure time. In non-limiting embodiments or aspects, the plurality of images comprises a first subset of images captured with the first exposure time and a second subset of images captured with the second exposure time, and wherein generating the RGB-D point cloud comprises: tracking a plurality of visual features in each image of the second subset of images; determining a subset of visual features of the plurality of visual features based on a distance of each visual feature of the subset of visual features to a laser stripe; and determining a subset of keyframes from the second subset of images based on the subset of visual features.

In non-limiting embodiments or aspects, the distance of each visual feature to the laser stripe is based on the first subset of images. In non-limiting embodiments or aspects, the RGB-D point cloud is generated by combining the visual data, the inertial data, and the depth data at the same time. In non-limiting embodiments or aspects, generating the RGB-D point cloud comprises: generating a plurality of colored laser points based on a colored light in the visual data and the depth data; determining an estimated camera motion; mapping each colored laser point of the plurality of colored laser points into the RGB-D point cloud within a spatial representation; and aligning at least a subset of the plurality of colored laser points based on the estimated camera motion. In non-limiting embodiments or aspects, generating the RGB-D point cloud is based on a Visual-Laser-Inertial-Odometry Simultaneous Localization and Mapping (VLIO-SLAM) algorithm, and the visual data comprises a sequence of keyframes, the method further comprising: initializing the VLIO-SLAM algorithm by generating initial estimates of keyframe poses and feature depths in a sliding window.

In non-limiting embodiments or aspects, generating the initial estimates of keyframe poses and feature depths in the sliding window comprises: identifying a first keyframe and a second keyframe in the sliding window, the first keyframe comprising a primary observation frame of at least one feature; determining an up-to-scale estimation between the first keyframe and the second keyframe; determining a depth of each common feature point in the first keyframe and the second keyframe; determining a scale based on a depth of at least a subset of the common feature points; and determining the keyframe poses of other keyframes in the sliding window. In non-limiting embodiments or aspects, the VLIO-SLAM algorithm comprises: determining keyframe poses, motion data, and inverse feature depths for each primary optimization frame of each feature of a plurality of features based on a nonlinear optimization. In non-limiting embodiments or aspects, the nonlinear optimization comprises: minimizing residuals comprising at least one of the following: visual feature depth residual, visual feature reprojection residual, motion data residual, window-to-map tracking residual, or any combination thereof. In non-limiting embodiments or aspects, the method further comprises: emitting colored light with a light emitting unit arranged within the device to at least a portion of the field of view.

According to non-limiting embodiments or aspects, provided is a computer program product for vision sensing comprising at least one non-transitory computer-readable medium including program instructions that, when executed by at least one processor, cause the at least one processor to: project, with a laser unit, a laser pattern within a field of view of a camera arranged in a device; capture inertial data from an inertial measurement unit arranged in the device as a user moves the device; capture visual data from the field of view with the camera as the user moves the device; capture depth data with the laser unit as the user moves the device; and generate, with at least one processor, an RGB-D point cloud based on the visual data, the inertial data, and the depth data.

Other preferred and non-limiting embodiments or aspects of the present invention will be set forth in the following numbered clauses:

Clause 1: A vision sensing device comprising: a housing; a camera arranged within the housing and having a field of view; a laser pattern generator arranged within the housing; an inertial measurement unit arranged within the housing; and at least one processor arranged within the housing and in communication with the camera, the laser pattern generator, and the inertial measurement unit, the at least one processor configured to: project a laser pattern within the field of view of the camera; capture inertial data from the inertial measurement unit as a user moves the housing; capture visual data from the field of view with the camera as the user moves the housing; capture depth data with the laser pattern generator as the user moves the housing; and generate an RGB-D point cloud based on the visual data, the inertial data, and the depth data.

Clause 2: The vision sensing device of clause 1, wherein the camera is configured to capture the visual data by: capturing a plurality of images in a series; and varying an exposure time of the camera while capturing at least two sequential images of the plurality of images in the series, such that the visual data comprises at least one first image with a first exposure time and at least one second image with a second exposure time longer than the first exposure time.

Clause 3: The vision sensing device of clauses 1 or 2, wherein the exposure time of the camera is varied by automatically alternating between the first exposure time and the second exposure time.

Clause 4: The vision sensing device of any of clauses 1-3, wherein the plurality of images comprises a first subset of images captured with the first exposure time and a second subset of images captured with the second exposure time, and wherein generating the RGB-D point cloud comprises: tracking a plurality of visual features in each image of the second subset of images; determining a subset of visual features of the plurality of features based on a distance of each visual feature of the subset of visual features to the laser stripe; and determining a subset of keyframes from the second subset of images based on the subset of visual features.

Clause 5: The vision sensing device of any of clauses 1-4, wherein the distance of each visual feature to a laser stripe is based on the first subset of images.

Clause 6: The vision sensing device of any of clauses 1-5, wherein the RGB-D point cloud is generated by combining the visual data, the inertial data, and the depth data at the same time.

Clause 7: The vision sensing device of any of clauses 1-6, wherein generating the RGB-D point cloud comprises: generating a plurality of colored laser points based on a colored light in the visual data and the depth data; determining an estimated camera motion; mapping each colored laser point of the plurality of colored laser points into the RGB-D point cloud within a spatial representation; and aligning at least a subset of the plurality of colored laser points based on the estimated camera motion.

Clause 8: The vision sensing device of any of clauses 1-7, wherein generating the RGB-D point cloud is based on a Visual-Laser-Inertial-Odometry Simultaneous Localization and Mapping (VLIO-SLAM) algorithm, wherein the visual data comprises a sequence of keyframes, and wherein the at least one processor is further configured to: initialize the VLIO-SLAM algorithm by generating initial estimates of keyframe poses and feature depths in a sliding window.

Clause 9: The vision sensing device of any of clauses 1-8, wherein generating the initial estimates of keyframe poses and feature depths in the sliding window comprises: identifying a first keyframe and a second keyframe in the sliding window, the first keyframe comprising a primary observation frame of at least one feature; determining an up-to-scale estimation between the first keyframe and the second keyframe; determining a depth of each common feature point in the first keyframe and the second keyframe; determining a scale based on the depth of at least a subset of the common feature points; and determining the keyframe poses of other keyframes in the sliding window.

Clause 10: The vision sensing device of any of clauses 1-9, wherein the VLIO-SLAM algorithm causes the at least one processor to: determine keyframe poses, motion data, and inverse feature depths for each primary optimization frame of each feature of a plurality of features based on a nonlinear optimization.

Clause 11: The vision sensing device of any of clauses 1-10, wherein the nonlinear optimization comprises minimizing residuals comprising at least one of the following: visual feature depth residual, visual feature reprojection residual, motion data residual, window-to-map tracking residual, or any combination thereof.

Clause 12: The vision sensing device of any of clauses 1-11, further comprising: a light emitting unit arranged within the housing and configured to emit colored light to at least a portion of the field of view when activated.

Clause 13: A vision sensing device comprising: a housing; a camera arranged within the housing and having a field of view; a laser pattern generator arranged within the housing; a light emitting unit arranged within the housing and configured to emit colored light to at least a portion of the field of view when activated; and at least one processor arranged within the housing and in communication with the camera, the laser pattern generator, and the light emitting unit, the at least one processor configured to: activate the light emitting unit to emit colored light to at least a portion of the field of view; capture visual data from the field of view with the camera as a user moves the housing; capture depth data with a laser unit as the user moves the housing; and generate an RGB-D point cloud based on the visual data and the depth data.

Clause 14: The vision sensing device of clause 13, wherein the camera is configured to capture the visual data by: capturing a plurality of images in a series; and varying an exposure time of the camera while capturing the plurality of images in the series, such that the visual data comprises at least one first image with a first exposure time and at least one second image with a second exposure time longer than the first exposure time.

Clause 15: The vision sensing device of clauses 13 or 14, wherein the exposure time of the camera is varied by alternating between the first exposure time and the second exposure time.

Clause 16: The vision sensing device of any of clauses 13-15, The vision sensing device of claim 1, wherein the RGB-D point cloud is generated by combining visual data, the inertial data, and the depth data at the same time.

Clause 17: The vision sensing device of any of clauses 13-16, wherein generating the RGB-D point cloud comprises: generating a plurality of colored laser points based on the colored light in the visual data and the depth data; determining an estimated camera motion; mapping each colored laser point of the plurality of colored laser points into the RGB-D point cloud within a spatial representation; and aligning at least a subset of the plurality of colored laser points based on the estimated camera motion.

Clause 18: The vision sensing device of any of clauses 13-17, wherein generating the RGB-D point cloud is based on a Visual-Laser-Inertial-Odometry Simultaneous Localization and Mapping (VLIO-SLAM) algorithm, wherein the visual data comprises a sequence of keyframes, and wherein the at least one processor is further configured to: initialize the VLIO-SLAM algorithm by generating initial estimates of keyframe poses and feature depths in a sliding window.

Clause 19: The vision sensing device of any of clauses 13-18, wherein generating the initial estimates of keyframe poses and feature depths in the sliding window comprises: identifying a first keyframe and a second keyframe in the sliding window, the first keyframe comprising a primary observation frame of at least one feature; determining an up-to-scale estimation between the first frame and the second frame; determining a depth of each common feature point in the first frame and the second frame; determining a scale based on the depth of at least a subset of the common feature points; and determining the keyframe poses of other keyframes in the sliding window.

Clause 20: The vision sensing device of any of clauses 13-19, wherein the VLIO-SLAM algorithm causes the at least one processor to: determine keyframe poses, motion data, and inverse feature depths for each primary optimization frame of each feature of a plurality of features based on a nonlinear optimization.

Clause 21: The vision sensing device of any of clauses 13-20, wherein the nonlinear optimization comprises minimizing residuals comprising at least one of the following: visual feature depth residual, visual feature reprojection residual, motion data residual, window-to-map tracking residual, or any combination thereof.

Clause 22: A vision sensing method comprising: projecting, with a laser unit, a laser pattern within a field of view of a camera arranged in a device; capturing inertial data from an inertial measurement unit arranged in the device as a user moves the device; capturing visual data from the field of view with the camera as the user moves the device; capturing depth data with the laser unit as the user moves the device; and generating, with at least one processor, an RGB-D point cloud based on the visual data, the inertial data, and the depth data.

Clause 23: The vision sensing method of clause 22, wherein capturing the visual data comprises: capturing a plurality of images in a series; and varying an exposure time of the camera while capturing at least two sequential images of the plurality of images in the series, such that the visual data comprises at least one first image with a first exposure time and at least one second image with a second exposure time longer than the first exposure time.

Clause 24: The vision sensing method of clauses 22 or 23, wherein the exposure time of the camera is varied by automatically alternating between the first exposure time and the second exposure time.

Clause 25: The vision sensing method of any of clauses 22-24, wherein the plurality of images comprises a first subset of images captured with the first exposure time and a second subset of images captured with the second exposure time, and wherein generating the RGB-D point cloud comprises: tracking a plurality of visual features in each image of the second subset of images; determining a subset of visual features of the plurality of visual features based on a distance of each visual feature of the subset of visual features to a laser stripe; and determining a subset of keyframes from the second subset of images based on the subset of visual features.

Clause 26: The vision sensing method of any of clauses 22-25, wherein the distance of each visual feature to the laser stripe is based on the first subset of images.

Clause 27: The vision sensing method of any of clauses 22-26, wherein the RGB-D point cloud is generated by combining the visual data, the inertial data, and the depth data at the same time.

Clause 28: The vision sensing method of any of clauses 22-27, wherein generating the RGB-D point cloud comprises: generating a plurality of colored laser points based on a colored light in the visual data and the depth data; determining an estimated camera motion; mapping each colored laser point of the plurality of colored laser points into the RGB-D point cloud within a spatial representation; and aligning at least a subset of the plurality of colored laser points based on the estimated camera motion.

Clause 29: The vision sensing method of any of clauses 22-28, wherein generating the RGB-D point cloud is based on a Visual-Laser-Inertial-Odometry Simultaneous Localization and Mapping (VLIO-SLAM) algorithm, and wherein the visual data comprises a sequence of keyframes, the method further comprising: initializing the VLIO-SLAM algorithm by generating initial estimates of keyframe poses and feature depths in a sliding window.

Clause 30: The vision sensing method of any of clauses 22-29, wherein generating the initial estimates of keyframe poses and feature depths in the sliding window comprises: identifying a first keyframe and a second keyframe in the sliding window, the first keyframe comprising a primary observation frame of at least one feature; determining an up-to-scale estimation between the first keyframe and the second keyframe; determining a depth of each common feature point in the first keyframe and the second keyframe; determining a scale based on a depth of at least a subset of the common feature points; and determining the keyframe poses of other keyframes in the sliding window.

Clause 31: The vision sensing method of any of clauses 22-30, wherein the VLIO-SLAM algorithm comprises: determining keyframe poses, motion data, and inverse feature depths for each primary optimization frame of each feature of a plurality of features based on a nonlinear optimization.

Clause 32: The vision sensing method of any of clauses 22-31, wherein the nonlinear optimization comprises: minimizing residuals comprising at least one of the following: visual feature depth residual, visual feature reprojection residual, motion data residual, window-to-map tracking residual, or any combination thereof.

Clause 33: The vision sensing method of any of clauses 23-32, further comprising: emitting colored light with a light emitting unit arranged within the device to at least a portion of the field of view.

Clause 34: A computer program product for vision sensing comprising at least one non-transitory computer-readable medium including program instructions that, when executed by at least one processor, cause the at least one processor to: project, with a laser unit, a laser pattern within a field of view of a camera arranged in a device; capture inertial data from an inertial measurement unit arranged in the device as a user moves the device; capture visual data from the field of view with the camera as the user moves the device; capture depth data with the laser unit as the user moves the device; and generate, with at least one processor, an RGB-D point cloud based on the visual data, the inertial data, and the depth data.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures shown in the separate attachment, in which.

DETAILED DESCRIPTION

Figure 1:
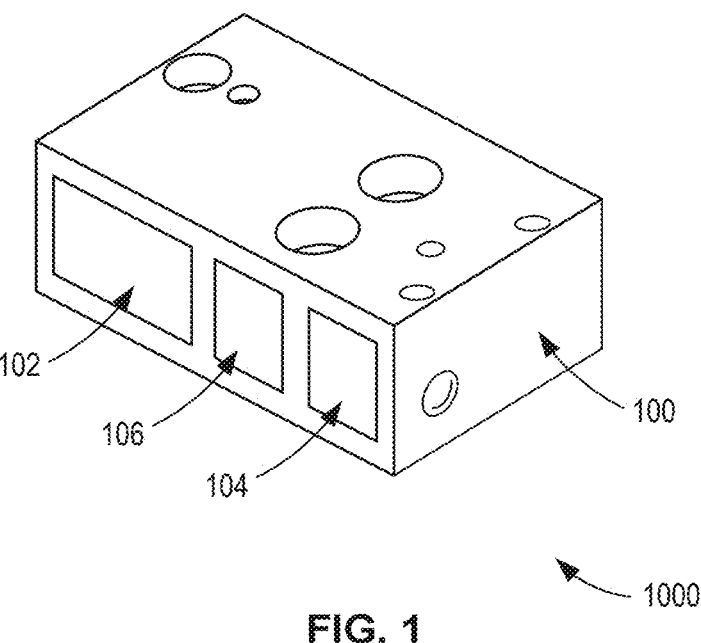
FIG. 1 is an illustration of a vision sensing device according to non-limiting embodiments or aspects.

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "processor" may refer to one or more electronic devices configured to process data. A processor may include, for example, a Central Processing Unit (CPU), a microprocessor, a controller, and/or any other computational device capable of executing logic. A "computer readable medium" may refer to one or more memory devices or other non-transitory storage mechanisms capable of storing compiled or non-compiled program instructions for execution by one or more processors.

In non-limiting embodiments, a vision sensing device is provided that overcomes technological deficiencies associated with existing devices and methods. A vision sensing device as described herein may be as small as 27×15×10 mm, for example, and with a sending range of 20-150 mm. By using localization as determined from an Inertial Measurement Unit (IMU) (e.g., one or more devices capable of monitoring rotation, position, orientation, and/or the like, such as through the use of one or more gyroscopes, accelerometers, and/or the like), and incorporating such IMU data into a modified SLAM function with camera data and laser data, scanning and reconstruction quality is enhanced. Non-limiting embodiments may be used in a variety of ways, including scanning in confined spaces. Moreover, in non-limiting embodiments a window-to-map tracking method is provided to enable consistency and accuracy with multi-pass scans. Using a laser pattern generator, such as a laser stripe scanner or any other device for projecting a laser pattern, and combining the laser data with IMU data, non-limiting embodiments enable infrastructure-free scanning without the need for positioning devices or localization aids. Further, the modified SLAM function described herein improves upon a monocular visual SLAM algorithm, which is only able to recover the up-to-scale structure (camera motion and map), leaving ambiguity with respect to scale.

Referring now to FIG. 1, shown is a vision sensing device 1000 according to non-limiting embodiments. The vision sensing device 1000 includes a housing 100 that exposes at least a portion of a camera unit 102, a light emitting unit 106, and a laser unit 104. The housing 100 may be compact. In non-limiting embodiments, the housing 100 may be dimensioned approximately 27×15×10 mm. It will be appreciated that various sizes, shapes, and dimensions may be used for the housing 100. The housing 100 may also be manufactured from any suitable material, such as metal, plastic, and/or the like. The exterior of the vision sensing device 1000 may also include one or more communication interfaces, such as a cable, port (e.g., a USB port or the like), and/or the like.

Figure 2:
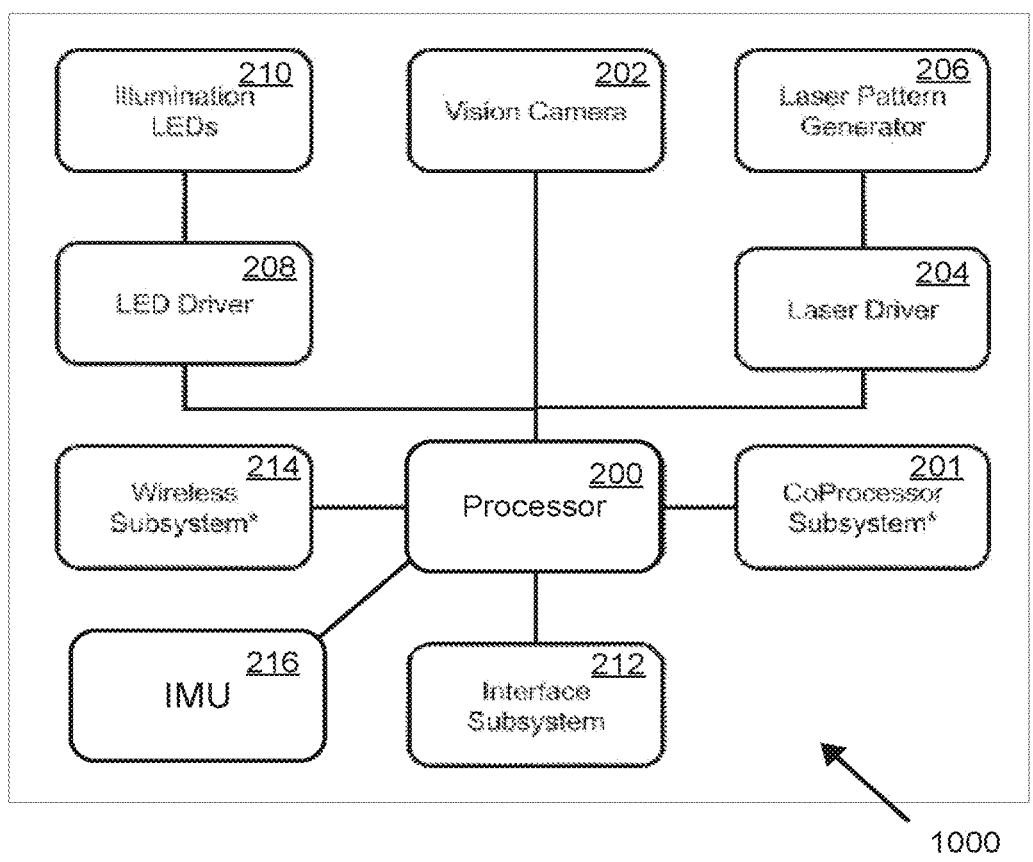
FIG. 2 is a schematic diagram of a vision sensing device according to non-limiting embodiments or aspects.

Referring now to FIG. 2, shown is a schematic diagram of a vision sensing device 1000 according to non-limiting embodiments. The vision sensing device 1000 includes a processor 200, a camera unit 202, a laser unit (laser driver 204 and laser pattern generator 206), a light emitting unit (Light Emitting Diodes (LEDs) 210 and LED driver 208), and an IMU unit 216. The vision sensing device 1000 may further include a wireless subsystem 214 (e.g., a radio frequency transceiver to communicate via Bluetooth®, WiFi®, and/or the like) and an interface subsystem 212 (e.g., a USB interface, a serial interface, and/or the like) for communicating with one or more external systems or devices. In non-limiting embodiments, the vision sensing device 1000 may include one or more additional processors 201. The processor 200 and/or additional processors 201 may have embedded program instructions stored thereon and/or may be in communication with one or more memory devices having program instructions (e.g., executable software applications) stored thereon. The vision sending device 1000 includes all of the hardware and software used to scan an object or environment without the need for relying on external processors.

In non-limiting embodiments, the camera unit 202 may be an RGB CMOS camera, the IMU 216 may be a MEMS-based 6-axis accelerometer and gyroscope, and the laser pattern generator 206 may be a laser-stripe projector that projects a single laser stripe pattern by refracting a thin laser beam through a cylindrical lens, projected to a region within the camera field-of-view. The laser stripe may be toggled on and off in synchronization with the camera shutter trigger to enable the capture of frames with alternating exposure times. However, it will be appreciated that other types of camera units, IMUs, and laser pattern generators may be utilized in connection with the devices and methods described herein. In non-limiting embodiments, multiple camera units, multiple laser units, and/or multiple IMUs may be used in a vision sensing device 1000. For example, an additional laser unit may project different patterns used for different orientations and/or different colored lasers (e.g., a red laser and a blue laser projected simultaneously).

Figure 3:
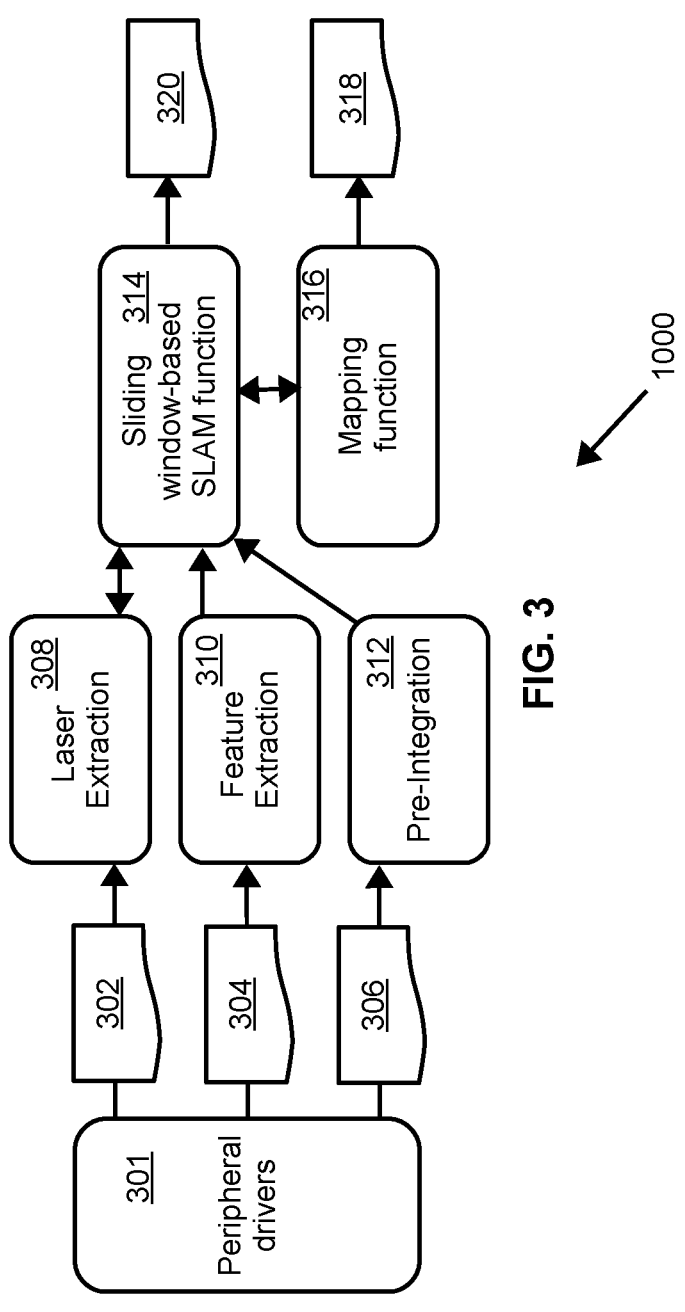
FIG. 3 is a further schematic diagram of a vision sensing device according to non-limiting embodiments or aspects.

Referring now to FIG. 3, shown is a further schematic diagram of a vision sensing device 1000 according to non-limiting embodiments. Software functions 308, 310, 312, 314, 316 may be stored as one or more applications embedded on one or more processors of the device 1000 or stored on separate memory. Software functions 308 may be software processes that are part of the same application or separate applications. Peripheral drivers 301 of the vision sensing device 1000 may include one or more device drivers for the camera unit, laser unit, IMU, light emitting unit, and the like. For example, a driver for an IMU may output IMU data 306 (e.g., motion data). A camera driver may output image frames 302, 304. In the illustrated example, image frame 302 may be one or more bright frames (e.g., longer exposure time, $\mathcal{I}_{le}$) and image frame 304 may be one or more dark frames (e.g., shorter exposure time, $\mathcal{I}_{se}$). Image frames 302, 304 may be two adjacent frames from a sequence of frames. Image frame 302, with a longer exposure time relative to image frame 304, may be neutrally exposed, with no laser stripe (e.g., captured when the laser pattern generator is off), and used for the SLAM function 312 and point cloud coloring. Image frame 304 may include a laser stripe (e.g., captured when the laser pattern generator is on) and may exhibit a higher laser-to-background contrast than image frame 302. Optimized for 3D geometry acquisition, $\mathcal{I}_{se}$ image frames are underexposed and exhibit a high laser-to-background contrast that may be used for laser extraction, while $\mathcal{I}_{le}$ image frames are neutrally exposed, with no laser stripe, are well-balanced in brightness, and are utilized for SLAM and point cloud coloring. The camera driver may alternate the exposure time between image frames to generate interleaving long exposure $\mathcal{I}_{le}$ and short exposure $\mathcal{I}_{se}$ images. To prevent the laser stripe from interfering with visual SLAM, the laser projector may be synchronized with the camera such that it is turned off for $\mathcal{I}_{le}$. For example, for a camera that runs at 60 frames per second (FOS), 30 FPS may be yielded for SLAM, and 30 FPS may be yielded for laser extraction.

Figure 5:
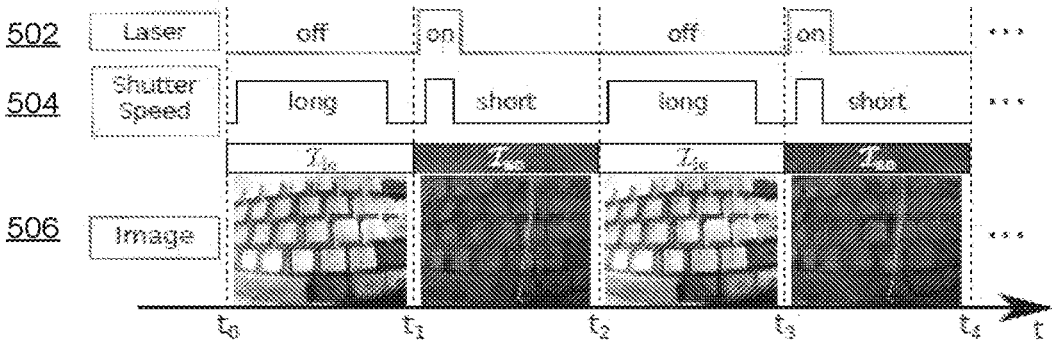
FIG. 5 is a timing diagram of a camera unit of a vision sensing device according to non-limiting embodiments or aspects.

Referring now to FIG. 5, a timing diagram of the camera unit is shown according to non-limiting embodiments. The diagram shows the laser state (on or off) (row 502), the shutter speed (e.g., a long or short exposure time) (row 504), and the corresponding image frame at various times t (row 506). As shown, the camera unit shutter alternates between long and short exposure times while maintaining the frame duration constant for all frames. The laser state automatically toggles synchronously with the alternating exposure times, producing a sequence of image frames that provide both RGB color information and depth information. For example, the laser pattern generator may be synchronized with the camera shutter to switch off for $\mathcal{I}_{le}$ image frames and on for $\mathcal{I}_{se}$ image frames. This allows for a monocular camera to capture both color and geometric information with a minimal time gap, allowing for the physical size of the vision sensing device 1000 to be minimized for confined spaces.

Referring back to FIG. 3, the feature extraction function 310 extracts and tracks visual features in each $\mathcal{I}_{le}$ (longer exposure time) image using, for example, KLT optical flow in which existing features in the previous frame are tracked and new feature points are extracted to maintain a minimum number of features. Features-on-laser $\mathcal{F}_l$ is defined as the subset of feature points $\mathcal{F}$ close to the laser scan. For these features, the laser point cloud can be used to accurately estimate feature depths. A feature $f_i$ is defined to be a feature-on-laser if any of its observations is close (e.g., within a predefined distance) to the laser stripe pixels in each adjacent $\mathcal{I}_{se}$ (shorter exposure time) images, and the observation frame with the feature's pixel position being the closest to the laser stripe is defined as the primary observation frame $c_{f_i}^*$, for feature $f_i$. The feature extraction function 310 may also select keyframes from the plurality of image frames it processes. For example, an $\mathcal{J}_{le}$ image may be determined to be a keyframe if the average feature parallax from the previous keyframe is sufficiently large (e.g., satisfies a threshold value) or the number of tracked features from the previous keyframe is too small (e.g., fails to satisfy a threshold value).

Still referring to FIG. 3, the laser extraction function 308 may process each $\mathcal{J}_{se}$ image by detecting the pixels including the laser stripe using, for example, a center-of-mass method and triangulating those pixels into 3D points. Color information for each laser point is retrieved via projective data association using several temporally adjacent keyframes. Given the pose of an interpolated $\mathcal{J}_{se}$ and the keyframes, each laser point is transformed into the global reference frame and then reprojected onto adjacent keyframes to find the average color of the associated pixels. As used herein, the term "pose" refers the location of the vision sensing device 1000 within an environment.

Figure 4:
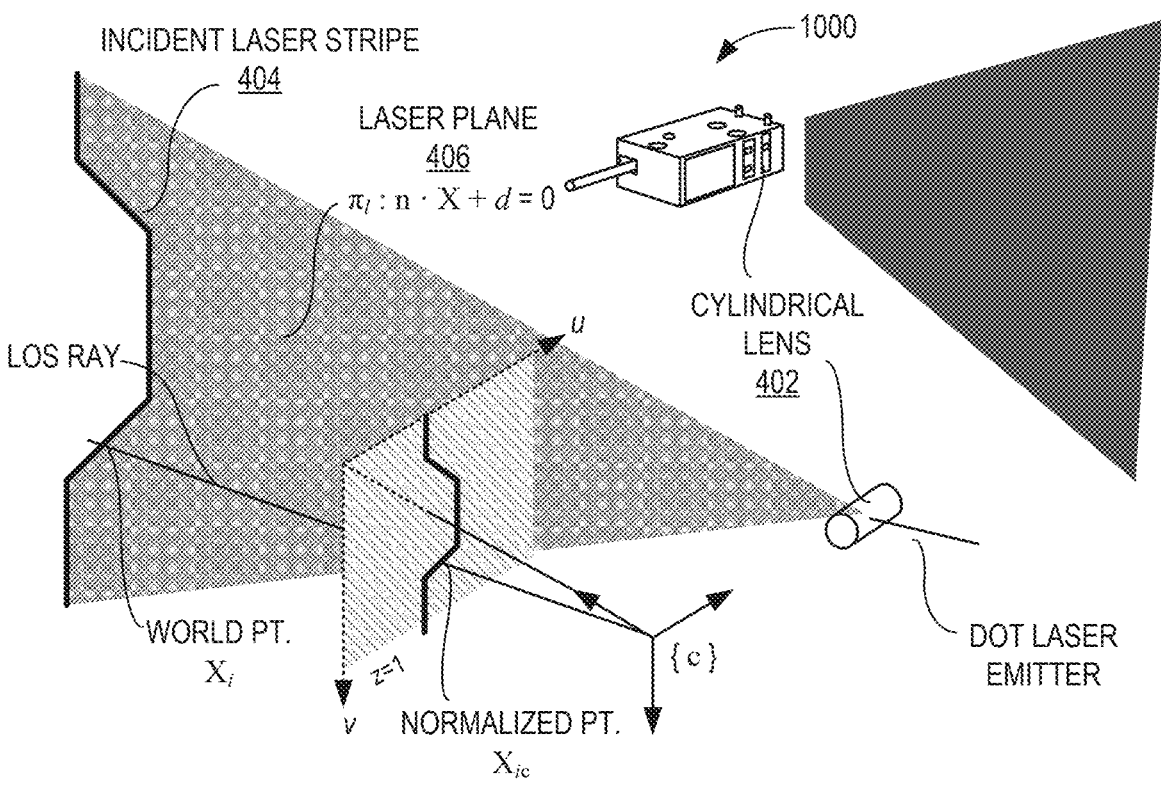
FIG. 4 is an illustration of a laser emitted from a vision sensing device according to non-limiting embodiments or aspects.

FIG. 4 shows a diagram of the laser emitted from the vision sensing device 1000 in non-limiting embodiments. The laser unit is used to generate 3D points from 2D image frames. The laser depth is triangulated by projecting a ray (e.g., a laser projection) within the field-of-view of the camera unit (e.g., a line-of-sight (LOS) laser projection from the origin of C through $X_{ic}$) and finding the intersection of the ray with the laser plane 406 identified from a laser stripe 404 projected through a cylindrical lens 402. For example, the projected laser stripe 404 may be modeled as a plane $\varnothing_i : n \cdot X + d = 0$ in 3D space, which intersects with the physical world. The depth of each image pixel observation $x_i$ of the laser stripe is estimated using triangulation by solving a ray-plane intersection problem as illustrated in FIG. 4 and represented by the following equation in which $X_i^c$ denotes a triangulated 3D point, $X_i$ is the 3D position of each incident laser stripe pixel $x_i = [u_i, v_i]$ on the image, and $\pi_c^{-1}$ denotes the back projection function that projects a pixel position onto a normalized image plane to obtain the normalized laser point $X_{ic} = \pi_c^{-1}(x_i)$:

$$X_i = \frac{-d}{n \cdot \pi_c^{-1}(x_i)} \pi_c^{-1}(x_i)$$

Figure 7:
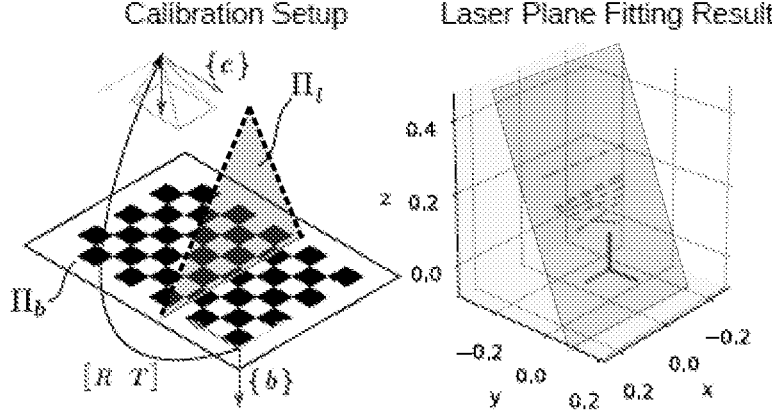
FIG. 7 is an illustration of a calibration method according to non-limiting embodiments or aspects.

In non-limiting embodiments, the vision sensing device 1000 may be calibrated to obtain the inverse projection function $(\pi_c^{-1})$ and the laser plane $(\Pi_l)$ without using external positioning infrastructure. Referring to FIG. 7, a calibration set-up and diagram is shown according to non-limiting embodiments. A known checker-patterned rectangle (e.g., such as a checkerboard with known dimensions) is placed in the field-of-view of the camera unit of the vision sensing device. The laser stripe is projected on the checkerboard plane $(\Pi_b)$ as shown in FIG. 7. To calibrate $(\Pi_l)$, the processor first determines $(\Pi_b)$ using the camera unit's extrinsics (part of $(\pi_c^{-1})$ which may be calibrated using a tool such as MATLAB Computer Vision Toolbox). Then, the processor causes a line-of-sight ray to be cast onto $(\Pi_b)$ and samples of 3D points are generated on the laser plane using the intersection points from the ray. The steps are repeated for all images taken from different poses to include 3D laser points of varying depths. Then, the underlying plane of the 3D points is determined using, for example, Singular Value Decomposition with Random Sample Consensus (RANSAC) or other like methods.

With continued reference to FIG. 3, the pre-integration function 312 may be any inertial integration function used to avoid repeated computation. The Visual-Laser-Inertial-Odometry Simultaneous Localization and Mapping (VLIO-SLAM) function 314 may involve one or more processes. The VLIO-SLAM function 314 utilizes a sliding window and combines visual feature measurements from the camera unit, depth measurements from the laser unit, and inertial measurements (e.g., motion data) from the IMU to achieve high localization accuracy. The visual feature measurements are a primary factor in estimating camera motion. The depth measurements provide the metric scale for the visual odometry and help maintain mapping consistency via point cloud alignment.

For example, the VLIO-SLAM function 314 may begin with an initialization process that involves generating initial estimates of keyframe poses and feature depths in a sliding window using the following process. First, two keyframes are identified in the sliding window that exhibit enough parallax such that the first keyframe is the primary observation frame of several features-on-laser. Next, an up-to-scale transformation between the two frames is estimated using, for example, an eight-point algorithm, with an arbitrary scale $s_0$. The depth d of all of the common feature points is then estimated by triangulation. The correct scale $\hat{s}$ is then estimated using each feature-on-laser's closest laser pixel's depth $\bar{d}$, where $$\bar{d} : \hat{s} = \left( \sum_i^K \bar{d}_i / \hat{d}_i \right) / K \cdot s_0$$

The correct scale s is then used to correct the poses and feature depths of the two keyframes. Once the two keyframes are initialized, poses of the remaining keyframes in the sliding window are estimated using, for example, a perspective-n-point algorithm, and other feature point depths in the sliding window are triangulated. The initialization process ends with a bundle adjustment that optimizes all poses and feature depths in the sliding window, and poses of the $\mathcal{J}_{se}$ image frames are interpolated between poses of adjacent keyframes to register individual laser scans into a global point cloud. Given an initialized camera motion trajectory and pre-calibrated extrinsic transformation between the camera and IMU, the inertial-related variables may be initialized, including biases, velocity, and gravity.

Still referring to FIG. 3, in non-limiting embodiments, the VLIO-SLAM function 314 is a modified SLAM framework that is configured to consider visual data, laser data, and inertial data in a tightly-coupled manner. The VLIO-SLAM function 314 is performed in a sliding window (e.g., a predetermined time span) of keyframes. Nonlinear optimization is employed to solve for state variables X including keyframe poses T, IMU states (linear velocity and biases), and inverse feature depths in each feature's primary observation frame. A combination of four types of residuals are minimized in the optimization problem: visual feature depth residual given laser point cloud, visual feature reprojection residual, inertial measurement residual, and window-to-map tracking residual. The VLIO-SLAM function 314 outputs odometry data 320 (e.g., data representing a change in position and/or orientation over time).

Features-on-Laser Depth Residual. In non-limiting embodiments, depths of $\mathcal{F}_l$ may be accurately estimated using the depth prior from the registered laser point cloud. The depth prior $\bar{d}_i$ of a feature-on-laser $f_i \in \mathcal{F}_l$ is computed by first finding the 3D points near the feature viewing ray from $c_{f_i}^*$ using projective data association techniques, and then fitting a 3D plane to those points and intersecting the plane with the feature viewing ray to find $\bar{d}_i$. Using these depth priors $\bar{d}$, a residual for $\mathcal{F}_l$ is introduced that is described in the following equation:

$$r_l(X) = \sum_{f_i = \mathcal{F}_l} \left\| \frac{1}{\lambda_i} - \bar{d}_i \right\|^2$$

Feature Reprojection Residual. In non-limiting embodiments, for each feature $f_i \in \mathcal{F}_1$, reprojection residuals are evaluated between the primary frame $c_{f_i}^*$ and every other observation frame in the sliding window C. In the below equation representing the reprojection residuals, $x_i^j$ denotes the pixel observation of the ith feature in the jth keyframe; $\pi_c(\cdot)$ denotes camera projection function and $\pi_c^{-1}(\cdot)$ denotes back projection function; and $T \in SE(3)$ denotes a transformation matrix.

$$r_c(X) = \sum_{i \in \mathcal{F}} \sum_{j \in C} \left\| \pi_c \left( T_w^{c_j} T_{c_{f_i}^*}^w \frac{1}{\lambda_i} \pi_c^{-1}(x_i^*) - x_i^j \right) \right\|^2$$

Inertial Measurement Residual. In non-limiting embodiments, the IMU measurement residual is defined to help estimate linear velocity, IMU biases, and camera poses. Since the laser point cloud provides metric scale information, the IMU is not necessary for the scanner to function but allows for directly observing roll and pitch angles and handling of abrupt motion.

Figure 6:
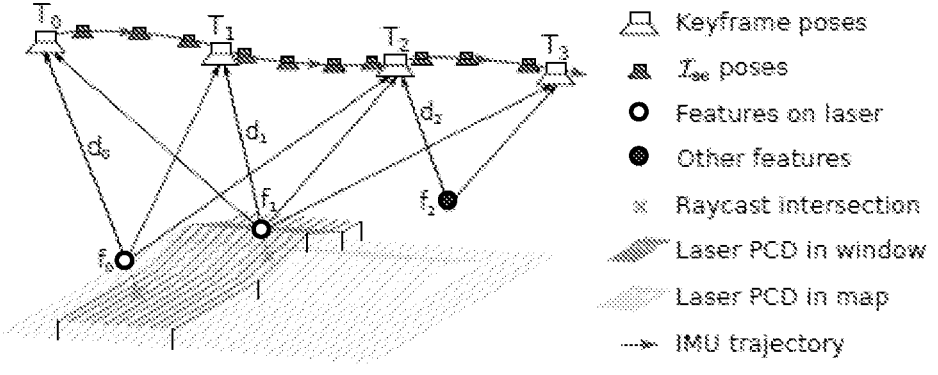
FIG. 6 is an illustration of a Visual-Laser-Inertial-Odometry Simultaneous Localization and Mapping (VLIO-SLAM) function according to non-limiting embodiments or aspects.

FIG. 6 shows a diagram of the VLIO-SLAM function according to non-limiting embodiments. The sliding window includes several keyframe poses from keyframes captured at times $T_0$-$T_3$. As shown, several other poses from $\mathcal{I}_{se}$ image frames are captured between each keyframe. The features $f_0$-$f_2$ represent the features from the keyframes in the illustrated example, where $f_0$ and $f_1$ are determined to be features-on-laser and $f_2$ is not. The sliding window point cloud data (PCD) (e.g., the PCD associated with a time span for the sliding window) is shown with respect to the previously-created mapped PCD.

Referring back to FIG. 3, the mapping function 316 generates a point cloud map representation where each map point contains the following attributes: a position $v \in \mathbb{R}^3$, a normal $n \in \mathbb{R}^3$, an RGB color $c \in \mathbb{R}^3$, and a weight $w \in \mathbb{R}$. Laser point cloud frames are added to the map after being out of the sliding window. For each laser point to add, if there exists a nearby map point p with compatible color and normal, then the new point is merged into p; if not, the new point is added to the map and its normal is estimated using a nearest neighbors algorithm. The weight attribute is the number of times that a map point is merged with a new point. Accumulation of odometry drift will violate mapping consistency when a user revisits a scanned region to fill reconstruction holes or to obtain a denser point cloud.

Using a frame-to-map tracking approach instead of a frame-to-frame approach results in laser points in a single frame being co-planar and geometrically insufficient to account for six degrees of freedom (DoF) motion. Therefore, in non-limiting embodiments, a window-to-map tracking approach is utilized in which the registered laser point cloud in the sliding window is aligned to the map. Since odometry drift exists within the sliding window, a non-rigid Iterative Closest Point problem is formulated where laser points from the same $\mathcal{I}_{se}$ are treated as rigid, but transformation between $\mathcal{I}_{se}$ frames is treated as nonrigid. This is achieved by incorporating per-point point-to-plane residual into the SLAM formulation as defined in the following equation:

$$r_{icp} = \sum_i w_i \left\| (v_i^g - f(T_{c_k}^w, T_{c_{k+1}}^w) v_i) \cdot n_i^g \right\|^2$$

In the above equation, $v_i$ is a laser point from an $\mathcal{I}_{se}$ in the sliding window, $c_k$ and $c_{k+1}$, are the two temporally adjacent keyframes, $f(\cdot)$ denotes a pose interpolation function to estimate the $\mathcal{I}_{se}$ pose using its timestamp, and $v_i^g$, $n_i^g$, and $w_i$ are attributes of the closest map point to $v_i$, which is searched for using KD-Tree.

The mapping function 316 outputs PCD that is representative of the object or environment scanned with the vision sensing device 1000. Various methods may be used to interpolate any missing data from the PCD that may result from imprecise movement during scanning or environmental disruptions. The vision sensing device 1000 may store the PCD on memory within the device 1000 and/or may communicate the PCD to an external device or system via wireless and/or wired communication. In non-limiting embodiments, the PCD may be a colorized 3D point cloud that represents an object or environment in space.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A vision sensing device comprising:
a housing;
a camera arranged within the housing and having a field of view;
a laser pattern generator arranged within the housing;
an inertial measurement unit arranged within the housing; and
at least one processor arranged within the housing and in communication with the camera, the laser pattern generator, and the inertial measurement unit, the at least one processor configured to:
project a laser pattern within the field of view of the camera;
capture inertial data from the inertial measurement unit as a user moves the housing;
capture visual data from the field of view with the camera as the user moves the housing, wherein the camera is configured to capture the visual data by:
capturing a plurality of images in a series; and
varying an exposure time of the camera while capturing at least two sequential images of the plurality of images in the series, such that the visual data comprises at least one first image with a first exposure time and at least one second image with a second exposure time longer than the first exposure time, wherein the plurality of images comprise a first subset of images captured with the first exposure time and a second subset of images captured with the second exposure time;
capture depth data with the laser pattern generator as the user moves the housing; and generate an RGB-D point cloud based on the visual data, the inertial data, and the depth data by:

tracking a plurality of visual features in each image of the second subset of images;

determining a subset of visual features of the plurality of features based on a distance of each visual feature of the subset of visual features to the laser pattern; and determining a subset of keyframes from the second subset of images based on the subset of visual features.

2. The vision sensing device of claim 1, wherein the exposure time of the camera is varied by automatically alternating between the first exposure time and the second exposure time.

3. The vision sensing device of claim 1, wherein the distance of each visual feature to the laser pattern is based on the first subset of images.

4. The vision sensing device of claim 1, wherein the RGB-D point cloud is generated by combining the visual data, the inertial data, and the depth data at the same time.

5. The vision sensing device of claim 1, wherein generating the RGB-D point cloud comprises:

generating a plurality of colored laser points based on a colored light in the visual data and the depth data;

determining an estimated camera motion;

mapping each colored laser point of the plurality of colored laser points into the RGB-D point cloud within a spatial representation; and aligning at least a subset of the plurality of colored laser points based on the estimated camera motion.

6. The vision sensing device of claim 1, wherein generating the RGB-D point cloud is based on a Visual-Laser-Inertial-Odometry Simultaneous Localization and Mapping (VLIO-SLAM) algorithm, wherein the visual data comprises a sequence of keyframes, and wherein the at least one processor is further configured to:

initialize the VLIO-SLAM algorithm by generating initial estimates of keyframe poses and feature depths in a sliding window.

7. The vision sensing device of claim 6, wherein generating the initial estimates of keyframe poses and feature depths in the sliding window comprises:

identifying a first keyframe and a second keyframe in the sliding window, the first keyframe comprising a primary observation frame of at least one feature;

determining an up-to-scale estimation between the first keyframe and the second keyframe;

determining a depth of each common feature point in the first keyframe and the second keyframe;

determining a scale based on the depth of at least a subset of the common feature points; and determining the keyframe poses of other keyframes in the sliding window.

8. The vision sensing device of claim 6, wherein the VLIO-SLAM algorithm causes the at least one processor to:

determine keyframe poses, motion data, and inverse feature depths for each primary optimization frame of each feature of a plurality of features based on a nonlinear optimization.

9. The vision sensing device of claim 8, wherein the nonlinear optimization comprises minimizing residuals comprising at least one of the following: visual feature depth residual, visual feature reprojection residual, motion data residual, window-to-map tracking residual, or any combination thereof.

10. The vision sensing device of claim 9, further comprising:

a light emitting unit arranged within the housing and configured to emit colored light to at least a portion of the field of view when activated, wherein the at least one processor is in communication with the light emitting unit and further configured to activate the light emitting unit to emit colored light to at least a portion of the field of view.

11. A vision sensing method comprising:

projecting, with a laser unit, a laser pattern within a field of view of a camera arranged in a device;

capturing inertial data from an inertial measurement unit arranged in the device as a user moves the device;

capturing visual data from the field of view with the camera as the user moves the device;

capturing depth data with the laser unit as the user moves the device; and generating, with at least one processor, an RGB-D point cloud based on the visual data, the inertial data, and the depth data by:

generating a plurality of colored laser points based on a colored light in the visual data and the depth data;

determining an estimated camera motion;

mapping each colored laser point of the plurality of colored laser points into the RGB-D point cloud within a spatial representation; and aligning at least a subset of the plurality of colored laser points based on the estimated camera motion.

12. The vision sensing method of claim 11, wherein capturing the visual data comprises:

capturing a plurality of images in a series; and varying an exposure time of the camera while capturing at least two sequential images of the plurality of images in the series, such that the visual data comprises at least one first image with a first exposure time and at least one second image with a second exposure time longer than the first exposure time.

13. The vision sensing method of claim 12, wherein the exposure time of the camera is varied by automatically alternating between the first exposure time and the second exposure time.

14. The vision sensing method of claim 12, wherein the plurality of images comprises a first subset of images captured with the first exposure time and a second subset of images captured with the second exposure time, and wherein generating the RGB-D point cloud comprises:

tracking a plurality of visual features in each image of the second subset of images;

determining a subset of visual features of the plurality of visual features based on a distance of each visual feature of the subset of visual features to a laser stripe; and determining a subset of keyframes from the second subset of images based on the subset of visual features.

15. The vision sensing method of claim 14, wherein the distance of each visual feature to the laser stripe is based on the first subset of images.

16. The vision sensing method of claim 11, wherein the RGB-D point cloud is generated by combining the visual data, the inertial data, and the depth data at the same time.

17. The vision sensing method of claim 11, wherein generating the RGB-D point cloud is based on a Visual-Laser-Inertial-Odometry Simultaneous Localization and Mapping (VLIO-SLAM) algorithm, and wherein the visual data comprises a sequence of keyframes, the method further comprising:

initializing the VLIO-SLAM algorithm by generating initial estimates of keyframe poses and feature depths in a sliding window.

18. The vision sensing method of claim 17, wherein generating the initial estimates of keyframe poses and feature depths in the sliding window comprises:

identifying a first keyframe and a second keyframe in the sliding window, the first keyframe comprising a primary observation frame of at least one feature;

determining an up-to-scale estimation between the first keyframe and the second keyframe;

determining a depth of each common feature point in the first keyframe and the second keyframe;

determining a scale based on a depth of at least a subset of the common feature points; and determining the keyframe poses of other keyframes in the sliding window.

19. The vision sensing method of claim 17, wherein the VLIO-SLAM algorithm comprises:

determining keyframe poses, motion data, and inverse feature depths for each primary optimization frame of each feature of a plurality of features based on a nonlinear optimization.

20. The vision sensing method of claim 19, wherein the nonlinear optimization comprises:

minimizing residuals comprising at least one of the following: visual feature depth residual, visual feature reprojection residual, motion data residual, window-to-map tracking residual, or any combination thereof.

21. The vision sensing method of claim 20, further comprising:

emitting colored light with a light emitting unit arranged within the device to at least a portion of the field of view.

22. A computer program product for vision sensing comprising at least one non-transitory computer-readable medium including program instructions that, when executed by at least one processor, cause the at least one processor to:

project, with a laser unit, a laser pattern within a field of view of a camera arranged in a device;

capture inertial data from an inertial measurement unit arranged in the device as a user moves the device;

capture visual data from the field of view with the camera as the user moves the device;

capture depth data with the laser unit as the user moves the device; and generate, with at least one processor, an RGB-D point cloud based on the visual data, the inertial data, and the depth data by:

generating a plurality of colored laser points based on a colored light in the visual data and the depth data;

determining an estimated camera motion;

mapping each colored laser point of the plurality of colored laser points into the RGB-D point cloud within a spatial representation; and aligning at least a subset of the plurality of colored laser points based on the estimated camera motion.

23. A vision sensing method comprising:

projecting, with a laser unit, a laser pattern within a field of view of a camera arranged in a device;

capturing inertial data from an inertial measurement unit arranged in the device as a user moves the device;

capturing visual data from the field of view with the camera as the user moves the device, wherein the camera is configured to capture the visual data by:

capturing a plurality of images in a series; and varying an exposure time of the camera while capturing at least two sequential images of the plurality of images in the series, such that the visual data comprises at least one first image with a first exposure time and at least one second image with a second exposure time longer than the first exposure time, wherein the plurality of images comprises a first subset of images captured with the first exposure time and a second subset of images captured with the second exposure time;

capturing depth data with the laser unit as the user moves the device; and generating, with at least one processor, an RGB-D point cloud based on the visual data, the inertial data, and the depth data by:

tracking a plurality of visual features in each image of the second subset of images;

determining a subset of visual features of the plurality of features based on a distance of each visual feature of the subset of visual features to the laser pattern; and determining a subset of keyframes from the second subset of images based on the subset of visual features.

* * * * *